US011606426B1

(12) United States Patent
Cascioli et al.

(10) Patent No.: US 11,606,426 B1
(45) Date of Patent: Mar. 14, 2023

(54) DATABASE ACCESS GATEWAY THROUGH DISTRIBUTED NETWORK NODES

(71) Applicant: ARCHITECTURE TECHNOLOGY CORPORATION, Eden Prairie, MN (US)

(72) Inventors: Joseph Cascioli, Ithaca, NY (US); Judson Powers, Ithaca, NY (US)

(73) Assignee: ARCHITECTURE TECHNOLOGY CORPORATION, Eden Prairie, MN (US)

( * ) Notice: Subject to any disclaimer, the term of this patent is extended or adjusted under 35 U.S.C. 154(b) by 517 days.

(21) Appl. No.: 16/661,645

(22) Filed: Oct. 23, 2019

(51) Int. Cl.
*H04L 67/1087* (2022.01)
*H04L 67/104* (2022.01)
*H04L 67/1061* (2022.01)
*G06F 16/93* (2019.01)
*H04L 9/08* (2006.01)
*H04L 9/06* (2006.01)
*H04L 9/00* (2022.01)

(52) U.S. Cl.
CPC .......... *H04L 67/1093* (2013.01); *G06F 16/93* (2019.01); *H04L 9/0643* (2013.01); *H04L 9/088* (2013.01); *H04L 67/1059* (2013.01); *H04L 67/1068* (2013.01); *H04L 9/50* (2022.05)

(58) Field of Classification Search
CPC ... H04L 67/1093; H04L 9/0643; H04L 9/088; H04L 67/1059; H04L 67/1068; G06F 16/93
See application file for complete search history.

(56) References Cited

U.S. PATENT DOCUMENTS

| 2019/0013933 | A1* | 1/2019 | Mercuri | G06F 16/904 |
| 2020/0042625 | A1* | 2/2020 | Balaraman | G06F 21/645 |
| 2020/0210519 | A1* | 7/2020 | Wang | G06F 21/6209 |
| 2020/0304289 | A1* | 9/2020 | Androulaki | G06F 21/64 |
| 2020/0374343 | A1* | 11/2020 | Novotny | G06F 17/12 |
| 2020/0389313 | A1* | 12/2020 | Singh | H04L 9/3239 |
| 2020/0389518 | A1* | 12/2020 | Zhang | H04L 9/3239 |
| 2021/0036868 | A1* | 2/2021 | Del Val Santos | H04L 67/1068 |
| 2021/0091957 | A1* | 3/2021 | Ford | H04L 9/0643 |

* cited by examiner

*Primary Examiner* — Shanto Abedin
(74) *Attorney, Agent, or Firm* — Foley & Lardner LLP

(57) ABSTRACT

A plurality of distributed network nodes may provide a decentralized access gateway to multiple, diverse types of databases. The plurality of distributed network nodes may host a private party blockchain. Each node may execute a peer-to-peer (P2P) client to perform operations associated with the private party blockchain. A subset of the nodes may be configured as validator nodes that may implement gossip protocols to cooperatively validate one or more database operations and generate a new block for the private party blockchain. Another subset of nodes may be configured as host nodes that may receive the new block and update a corresponding local copy of the private party blockchain appending the new block. Utilizing the co-operative validation of database operations and the updates appending the new blocks, the private party blockchain may maintain an immutable digital record of access and updates to the multiple and diverse types of databases.

20 Claims, 4 Drawing Sheets

DATABASE ACCESS GATEWAY THROUGH DISTRIBUTED NETWORK NODES

TECHNICAL FIELD

This application is generally directed to access control to diverse types of databases and more specifically to a database access gateway through distributed network nodes.

BACKGROUND

Electronic database management has provided many benefits over manual, pen-and-paper based database management. Electronic databases may conveniently be accessed and edited through networks such as the Internet. Furthermore operations such as database accesses, database edits, database updates, and other operations are not as cumbersome and time consuming as manual databases. Furthermore, multiple copies of electronic databases may be generated with ease.

Notwithstanding these and other benefits of electronic databases, conventionally maintained electronic databases have several technical shortcomings. For example, large organizations may have large and geographically distributed databases making access management, user tracking, and data securing very difficult. Further, organizations may have to share the databases with other organizations. While database technology has contributed greatly to facilitating data sharing, centralized database management has lagged behind in other areas. Not being able to keep up with throughput needed by larger networks and having a single point of failure are among the chief concerns. Managing users and data from different sources in a shared environment is also something centralized databases are not equipped to handle.

As such, a significant improvement upon electronic database management and access control is therefore desired, especially for multiple types of databases.

SUMMARY

What is therefore desired are systems and methods that provide a decentralized access gateway to multiple, diverse types of databases. What is further desired are database access systems that avoid a single point of failure.

Embodiments presented herein attempt to solve the aforementioned technical problems and may provide other solutions as well. A plurality of distributed network nodes may provide a decentralized access gateway to multiple, diverse types of databases. The plurality of distributed network nodes may host a private party blockchain. To that end, each node may execute a peer-to-peer (P2P) client to perform operations associated with the private party blockchain. A subset of the nodes may be configured as validator nodes that may implement gossip protocols to cooperatively validate one or more database operations and generate a new block for the private party blockchain. Another subset of nodes may be configured as host nodes that may receive the new block and update a corresponding local copy of the private party blockchain appending the new block. Utilizing the co-operative validation of database operations and the updates appending the new blocks, the private party blockchain may maintain an immutable digital record of access and updates to the multiple and diverse types of databases.

In one embodiment, a system comprises a plurality of distributed network nodes, each network node having a non-transitory storage medium storing a plurality of computer program instructions forming a peer-to-peer client and a processor electrically coupled to the non-transitory storage medium and configured to execute the plurality of computer program instructions to perform one or more operations of a private party blockchain hosted by the plurality of distributed network nodes; the private party blockchain configured to validate one or more database operations of a plurality of secure databases of different types interfacing the plurality of distributed network nodes; a first subset of the plurality the distributed network nodes configured to be validator nodes causing the corresponding processors to execute corresponding peer-to-peer clients to gossip with each other to co-operatively validate the one or more database operations and generate a new block; and a second subset of the plurality of distributed network nodes configured to be host nodes causing the corresponding processors to execute corresponding peer-to-peer clients update the corresponding local copies of the private party blockchain appending the new block generated by the validator nodes.

In another embodiment, a computer-implemented method comprises performing, by a first network node of a plurality of distributed network nodes, a database operation associated with at least one of a plurality of secure databases of different types interfacing the plurality of distributed network nodes, wherein the plurality of distributed network nodes host a private party blockchain; gossiping, by a first subset of the plurality of distributed network nodes operating as validator nodes, information associated with the database operation with each other; co-operatively generating, by the first subset of the plurality of distributed network nodes, a new block by validating the database operation utilizing the gossiped information; and updating, by a second subset of the plurality of distributed network nodes operating as host nodes, corresponding local copies of the private party blockchain appending the new block generated by the first subset of the plurality of distributed network nodes operating as validator nodes.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1:
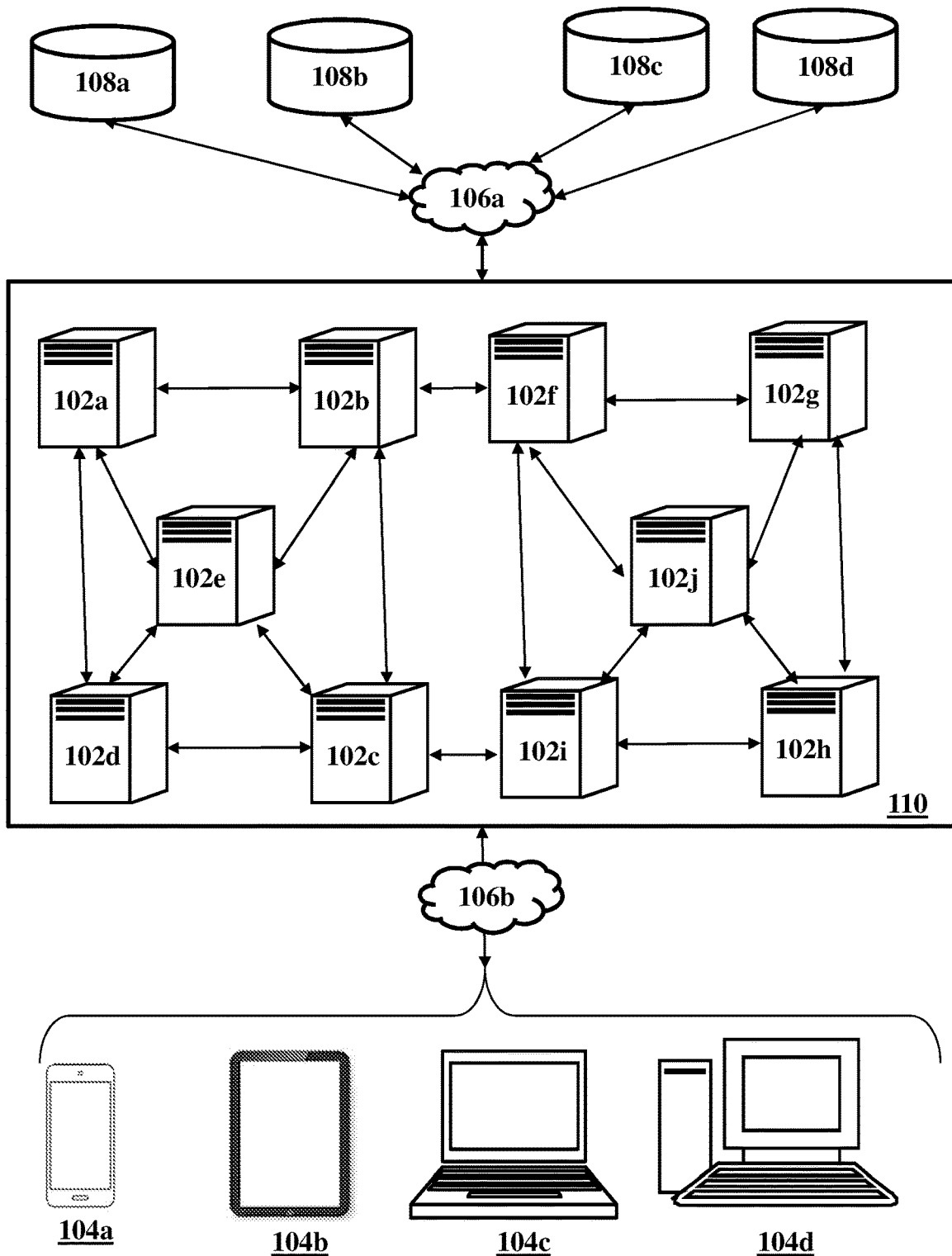
FIG. 1 shows an illustrative system of a distributed access gateway to a plurality of secure databases, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein describe systems and methods for access control of diverse types of databases utilizing a plurality of distributed network nodes. The plurality of distributed network nodes may form an access gateway to the databases. Each of the network nodes may execute a P2P client to perform blockchain operations of a private party blockchain hosted by the distributed network nodes. Unlike conventional public blockchains where every node is competitively attempting to generate a new block, the validator nodes in the private party blockchain co-operatively generate new blocks to update the private party blockchain.

The databases may be different types of databases. The databases may be associated with an organization and may store different types of information of the organization. For example, a database may store documents in any format and another database may store data records of employees of the organization. In other instances, the databases may be associated with different organizations storing diverse types of information corresponding to the different organizations. The databases may also have different levels of security, some requiring a higher level of authentication while others requiring a lower level of authentication. Furthermore, the databases may be geographically distributed and accessing the databases may require traversing through different types of networks.

The distributed network nodes may form an access gateway for the plurality of databases. As described above the distributed network nodes may host a private party blockchain that may maintain an immutable records of the database operations such as accesses and updates. In particular, the private party blockchain may include records of when a database was accessed or updated, what portion of the database was accessed or updated, who accessed or updated the database, and/or any other information associated with database access and/or updates. In some instances, the private party blockchain may store the cryptographic hashes of the information and the non-hashed (e.g., plaintext) information may be stored in a non-blockchain repository. In other instances, the plaintext information may be encrypted and stored in the blockchain along with the corresponding hashes. In some other instances, the blockchain may store the hashes and the non-encrypted information. Regardless of the modality of the storage of the non-hashed information, the sequence of hashes in the private party blockchain may ensure the integrity of the document access and update data. For example, if a malicious node tampers with a block in the blockchain, the entire downstream blocks will be different and the networks node will be unable to come to a consensus on the downstream blocks of the maliciously generated block.

In an embodiment, one or more databases may store documents (e.g., research documents) and distributed network nodes may form an access gateway for accessing, updating, and/or sharing of the documents. The private party blockchain may have immutable records of the provenance information of the documents. For example, the private party blockchain may include records of the creator of a document, the time of creation of the document, parties who accessed and/or updated the document, and/or the updates to the document. Therefore, even though the documents themselves may be stored in a central server, the provenance information of the documents is decentralized such that there may not be a single point of failure.

The distributed network nodes may also store public keys of multiple users to provide encrypted documents to the user. For example, a host P2P client may receive, validate, and store a public key associated with a first user. When the first user properly requests a document (e.g., by providing correct authentication credentials), the P2P client may encrypt the document with the public key of the first user. The user's device may in turn utilize the private key of the user to decrypt the document. In some instances, the P2P client may provide an encrypted copy of the document, e.g., the first user may download the encrypted document and use the private key for decryption. In other instances, the P2P client may stream the encrypted document such that the user may decrypt the document for viewing without necessarily being able to download the document.

To update the private party blockchain, a plurality of validator nodes may co-operatively generate a new block containing validated database operations. For example, the network may select a subset of validator nodes based upon proof of authority, which may then gossip with each other and other host nodes to validate one or more database operations and generate a new block. Therefore, as opposed to conventional proof of work protocol that consumes a large network energy as every single node is competitively trying to generate a new block, the private party blockchain may consume a lower network energy while providing a distributed access gateway.

A gossip between the different network nodes as used herein refers to information transfer by the nodes such that the network gets saturated with the information being transferred. A network saturation refers to a threshold number of nodes (e.g., depending upon the consensus protocol) receiving the information. Network saturation may also be referred to as a network convergence. The network nodes may use one or more protocols to gossip information to each other. In an illustrative protocol, a network node may maintain a list of other network nodes with active communication links with the network node, e.g., based upon a past successful acknowledgment of a sent message. The list of other network nodes may also be referred to as neighbor nodes for the network node. For gossiping, the network node may transmit a piece of information (e.g., a record of a database edit) to every neighbor node. Similarly, if a neighbor node has received the information from another node, the neighbor node may transmit the information to the network node. It should generally be understood that gossiping refers to each network node co-operatively and non-competitively (e.g., by not withholding information) sharing information with its neighbor nodes.

FIG. 1 shows an illustrative system 100 for providing an access gateway to multiple and diverse types of databases, according to an embodiment. As shown, the system 100 may comprise distributed network nodes 102a-102j (collectively or commonly referred to as 102) forming an access gateway 110, client devices 104a-104d (collectively or commonly referred to as 104), networks 106a, 106b (collectively or commonly referred to as 106), and databases 108a-108d (collectively or commonly referred to as 108). It should be understood that the system 100 and the aforementioned components are illustrative and should not be considered limiting. Systems with additional, alternative, or fewer number of components should be considered within the scope of this disclosure.

The distributed network nodes 102 may include any kind of computing devices that may host a private party blockchain. At minimum, a network node 102 may comprise a non-transitory storage medium (e.g., hard disk drive, random access memory) and a processor electrically coupled to the non-transitory storage medium. In addition to an operating system and/or other applications, the non-transitory storage medium may store a plurality of computer program instructions forming a P2P client software. The processor may execute the P2P client software to implement the blockchain functions described throughout this disclosure. Non-limiting examples of the network node 102 include a server computer, a desktop computer, a laptop computer, a tablet computer, and a smartphone.

A network node 102 may be configured as a host node. A processor executing the P2P client at the host node may append a validated block to a local copy of the blockchain. The host node may receive the validated block from another host node or from a validator node. The validated block may include records of one or more database operations. As shown in FIG. 1, network nodes 102a-102d, 102f-102i may be configured as host nodes.

A network node 102 may be considered as a validator node. A processor executing the P2P client at the validator node may validate one or more database operations and co-operatively generate a new block for the blockchain hosted by the distributed network nodes 102. To co-operatively generate the new block, the P2P client may execute one or more gossip protocols to communicate with one or more other validator nodes. After the validator node has generated the new block, the validator node may transmit the new block to other host nodes for the host nodes to append the new block to the corresponding blockchains. As shown in FIG. 1, network nodes 102e, 102j may be configured as validator nodes.

The client computing devices 104 may include kind of computing device such as a desktop computer 104d, a laptop computer 104c, a tablet computer 104b, a smartphone 104a, and/or any other type of computing device. The client computing devices 104 may include an electronic storage storing computer program instructions and at least one processor that may execute the computer program instruction. The client computing device 104 may also include a memory to store the computer program instructions during execution and store the results of the execution. The client computing devices 104 may communicate with the access gateway 110 through the network 106b.

The databases 108 may include any kind of electronic databases. The databases 108 may be hosted by any kind of database hardware environment such as database servers. The databases 108 may be diverse types of database. A first database 108a may be a relational database while a second database 108b may be a non-relational database. Another database 108c may be maintained by an organization and another database 108d is maintained by another organization. These databases 108a, 108b may have different access and update rules. The databases 108 may further store different types of data, e.g., data records with different types of data fields. The databases 108 may also have different levels of security thereby requiring different types of authentication. It should be understood that these are but a few illustrative examples of different types of databases and should not be considered limiting, any kind of databases 108 with differing attributes should be considered within the scope of this disclosure. The access gateway 110 may access the databases 108 through the network 106b.

The networks 106 may include any form of communication medium between the components of the system 100. Examples of the network 106 include, but are not limited to, Local Area Network (LAN), Wireless Local Area Network (WLAN), Metropolitan Area Network (MAN), Wide Area Network (WAN), and the Internet. The communication over the network 106 may be performed in accordance with various communication protocols, such as Transmission Control Protocol and Internet Protocol (TCP/IP), User Datagram Protocol (UDP), and IEEE communication protocols. It should be understood that the networks 106 may include both packet switching and circuit switching e.g., telephony) components. It should further be understood that the networks 106a, 106b are shown and described are merely illustrative and should not be considered limiting. There may be multiple networks or single network to facilitate communications between the different components of the system 100.

In an illustrative operation, a client computing device 104 may request a database update to a database 108 through the access gateway HO. More specifically, the client computing device 104 may generate a database update request and provide the request to a network node 102 in the access gateway 110. The network node may query the private party blockchain to retrieve one or more blocks associated with the database 108. When the network node 102 determines that the update request is valid based on the blockchain query, the update request may be validated and transferred to the corresponding database 108. Furthermore, the network node 102 may use the validators to update the private party blockchain with the update request and any updates associated with the update request.

Figure 2:
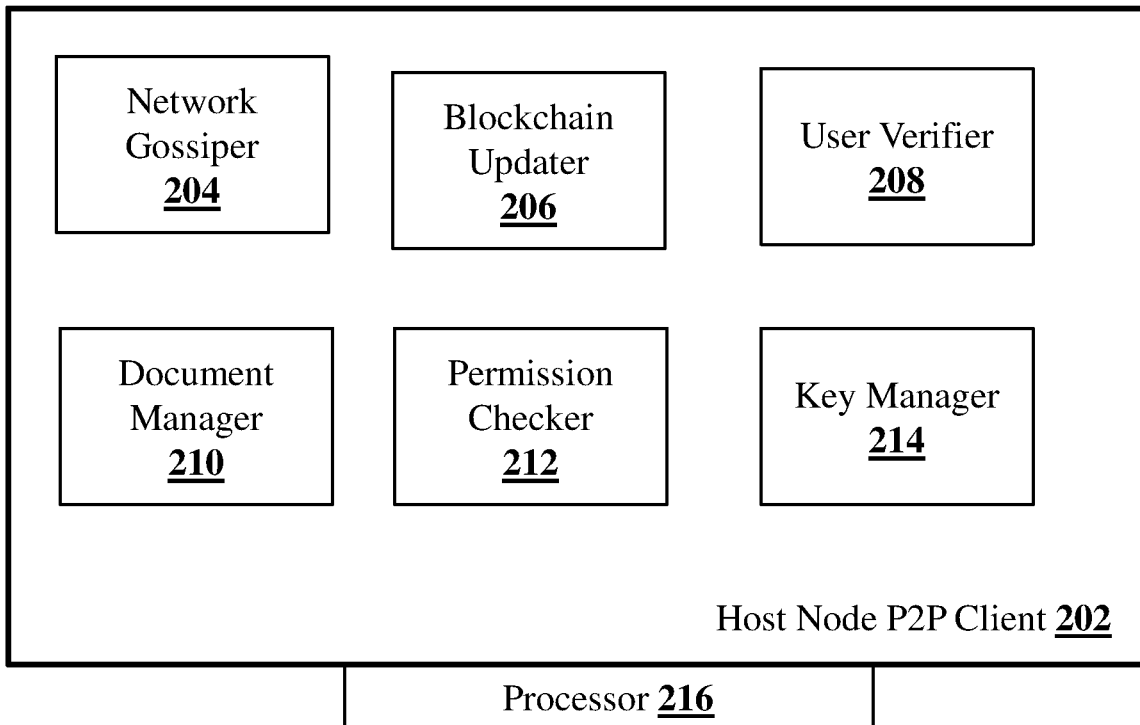
FIG. 2 shows illustrative software modules of a host P2P client, according to an embodiment.

FIG. 2 shows illustrative software modules 200 of a host node P2P client 202, according to an embodiment. As shown, the software modules may include a network gossiper 204, a blockchain updater 206, a user verifier 208, a document manager 210, a permission checker 212, and a key manager 214. It should be understood that the software modules 200 as shown in FIG. 2 and described herein are merely illustrative and additional, alternative, or fewer number of software modules should be considered to be within the scope of this disclosure. The software modules 200 may be stored as a plurality of computer program instructions in a non-transitory storage medium on the host node. The software modules 200 may be executed by a processor 216 electrically coupled to the non-transitory storage medium.

The network gossiper 204 may implement one or more gossip protocols to communicate with other nodes (e.g., host nodes, validator nodes). For example, the network gossiper 204 along with the network gossipers of the other nodes may enable a saturation of information within a plurality of distributed nodes. More specifically, the network node gossiper 204 may receive data records indicating access and/or updates to one or more databases, store the received information, and transmit the received information to other nodes. To that end, the network gossiper 204 may maintain a list of other nodes with working communication links with the host node client 202. The network gossiper 204 may periodically update the list to accommodate for the changing parameters of the network. The network gossiper 204 may also receive a validated block and provide the validated block to the blockchain updater 206.

The blockchain updater 206 may maintain and update a local copy of the private party blockchain. For instance, the blockchain updater 206 may receive a new block containing validated database operations and append the new block to the local copy of the blockchain. In some instances, the blockchain updater 206 may receive the new node from another host node through a gossip protocol implemented by the network gossiper 204. In other instances, the blockchain updater 206 may receive the new node from a validator node. The blockchain updater 206 may further gossip with other nodes to download the latest valid blockchain. It should be understood that these are merely illustrative operations performed by the blockchain updater 206 and other operations for maintaining and updating the private party blockchain should be considered within the scope of this disclosure.

The user verifier 208 may authenticate or other verify an identity of user attempting to access a database through an access gateway enabled by the plurality of network nodes. To that end, the user verifier 208 may prompt authentication credentials from a user and compare received authentication credentials with corresponding user credentials stored on the access gateway. The user verifier 208 may also perform a multi-factor authentication prompting the user to provide different pieces of verifiable information through different communication channels. It should be understood that the user verification performed by the user verifier 208 may in addition to or as an alternative to the authentication protocol executed by a database that the user is attempting to access through the access gateway.

The document, manager 214) may manage access, download, and/or update control of documents downloaded from the databases using the access gateway. Depending upon the security level and permissions framework of a corresponding database, the document manager 210 may directly download a document and provide a document to a client device. In other instances, the document manager 210 may store the downloaded document locally and allow access to the document to the client device. In some embodiments, the document manager 214) may not directly download the document, but produce access information (e.g., document address within the corresponding database and access credentials to the document and provide the access information to the client device. The document manager 210 may track the usage of the document and associated metadata and upload the tracking information to the blockchain. In other words, the private part blockchain may have an immutable audit log of each document downloaded from the one or more databases.

The permission checker 212 may compare a user's permission with document permission and determine whether a requested document should be provided to the user. The user may be, for example, associated with a particular level of permission. The levels of permissions may be hierarchical, users with more authority within the system may have a hierarchically higher permission level and users with less authority within the system may have a lower permission level. Similarly, more secure documents may have to be restricted and therefore be associated with a higher level of permission and less secure documents may not require a higher level of restriction and therefore may be associated with lower level of permission. Therefore, for every document access request, the permission checker 212 may verify that the permission level of the requesting user matches the permission level of the document. If there is a match, the permission checker 212 may cause the document manger 210 to provide an access to the document. If there is no match and the permission level of the requesting user is lower than the permission level of the document, the permission checker 212 may request the document manager not to provide access to the requested document to the requested user.

The key manger 214 may manage cryptographic keys associated with different users. For example, the key manager 214 may receive and store a user's public key. When the user requests a document or any other downloadable material, the key manager 215 may encrypt the document with the user's public key and provide the encrypted document to the user. In other instances, key manager may provide the user's public key to the database or the document manager to encrypt and stream a document to the user such that the user may decrypt the streamed encrypted document using the user's private key. In addition to receiving and storing the public key of the user, the key manager 214 may verify the public key of the user through, for example, public key infrastructure.

Figure 3:
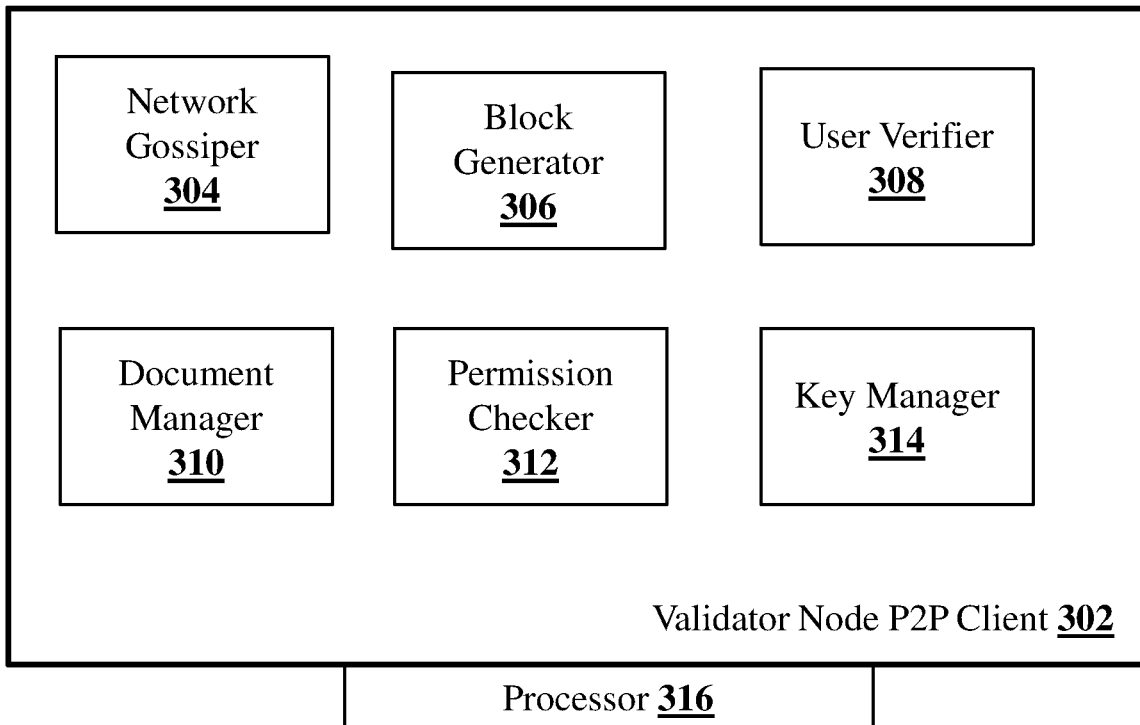
FIG. 3 shows illustrative software modules of a validator P2P client, according to an embodiment.

FIG. 3 shows illustrative software modules 300 of a validator node P2P client 302, according to an embodiment. As shown, the software modules 300 may include a network gossiper 304, a block validator 306, a user verifier 308, a document manager 310, a permission checker 312, and a key manager 314. It should be understood that the software modules 300 as shown in FIG. 3 and described herein are merely illustrative and additional, alternative, or fewer number of software modules should be considered to be within the scope of this disclosure. The software modules 300 may be stored as a plurality of computer program instructions in a non-transitory storage medium on the host node. The software modules 300 may be executed by a processor 316 electrically coupled to the non-transitory storage medium.

The network gossiper 304 may implement one or more gossip protocols to communicate with other nodes (e.g., host nodes, validator nodes). For example, the network gossiper 304 along with the network gossipers of the other nodes may enable a saturation of information within a plurality of distributed nodes. More specifically, the network node gossiper 304 may receive data records indicating access and/or updates to one or more databases, store the received information, and transmit the received information to other nodes. To that end, the network gossiper 304 may maintain a list of other nodes with working communication links with the validator node P2P client 302. The network gossiper 304 may periodically update the list to accommodate for the changing parameters of the network. As the network gossiper 304 is within the validator P2P client 302, the network gossiper 304 may communicate with other validator nodes to validate one or more database operations (e.g., document access/update) and generate a new block. The network gossiper 304 may further provide a newly generated block to other host nodes for the host nodes to update their respective copies of the blockchain.

The block generator 306 may generate a new block for the private party blockchain. The new block may include one or more validated database operations. The block generator 306 may invoke the network gossiper 304 to cooperatively generate the new block. In some instances, the new block may include records of the one or more validated database operations and a cryptographic hash of a combination of content of the new block and the contents of one or more previous blocks. In some instances, the new block may just include the cryptographic hash without the data records. In other instances, the new block may include a cryptographic hash and the content encrypted with one or more keys.

The user verifier 308 may authenticate or other verify an identity of user attempting to access a database through an access gateway enabled by the plurality of network nodes. To that end, the user verifier 308 may prompt authentication credentials from a user and compare received authentication credentials with corresponding user credentials stored on the access gateway. The user verifier 308 may also perform a multi-factor authentication prompting the user to provide different pieces of verifiable information through different communication channels. It should be understood that the user verification performed by the user verifier 308 may in addition to or as an alternative to the authentication protocol executed by a database that the user is attempting to access through the access gateway.

The document, manager 314) may manage access, download, and/or update control of documents downloaded from the databases using the access gateway. Depending upon the security level and permissions framework of a corresponding database, the document manager 310 may directly download a document and provide a document to a client device. In other instances, the document manager 310 may store the downloaded document locally and allow access to the document to the client device. In some embodiments, the document manager 210 may not directly download the document, but produce access information (e.g., document address within the corresponding database and access credentials to the document) and provide the access information to the client device. The document manager 310 may track the usage of the document and associated metadata and upload the tracking information to the blockchain. In other words, the private party blockchain may have an immutable audit log of each document downloaded from the one or more databases.

The permission checker 312 may compare a user's permission with document permission and determine whether a requested document should be provided to the user. The user may be, for example, associated with a particular level of permission. The levels of permissions may be hierarchical, users with more authority within the system may have a hierarchically higher permission level and users with less authority within the system may have a lower permission level. Similarly, more secure documents may have to be restricted and therefore be associated with a higher level of permission and less secure documents may not require a higher level of restriction and therefore may be associated with lower level of permission. Therefore, for every document access request, the permission checker 312 may verify that the permission level of the requesting user matches the permission level of the document. If there is a match, the permission checker 312 may cause the document manger 310 to provide an access to the document. If there is no match and the permission level of the requesting user is lower than the permission level of the document, the permission checker 312 may request the document manager not to provide access to the requested document to the requested user.

The key manger 314 may manage cryptographic keys associated with different users. For example, the key manager 214 may receive and store a user's public key. When the user requests a document or any other downloadable material, the key manager 215 may encrypt the document with the user's public key and provide the encrypted document to the user. In other instances, key manager may provide the user's public key to the database or the document manager to encrypt and stream a document to the user such that the user may decrypt the streamed encrypted document using the user's private key. In addition to receiving and storing the public key of the user, the key manager 314 may verify the public key of the user through, for example, public key infrastructure.

Figure 4:
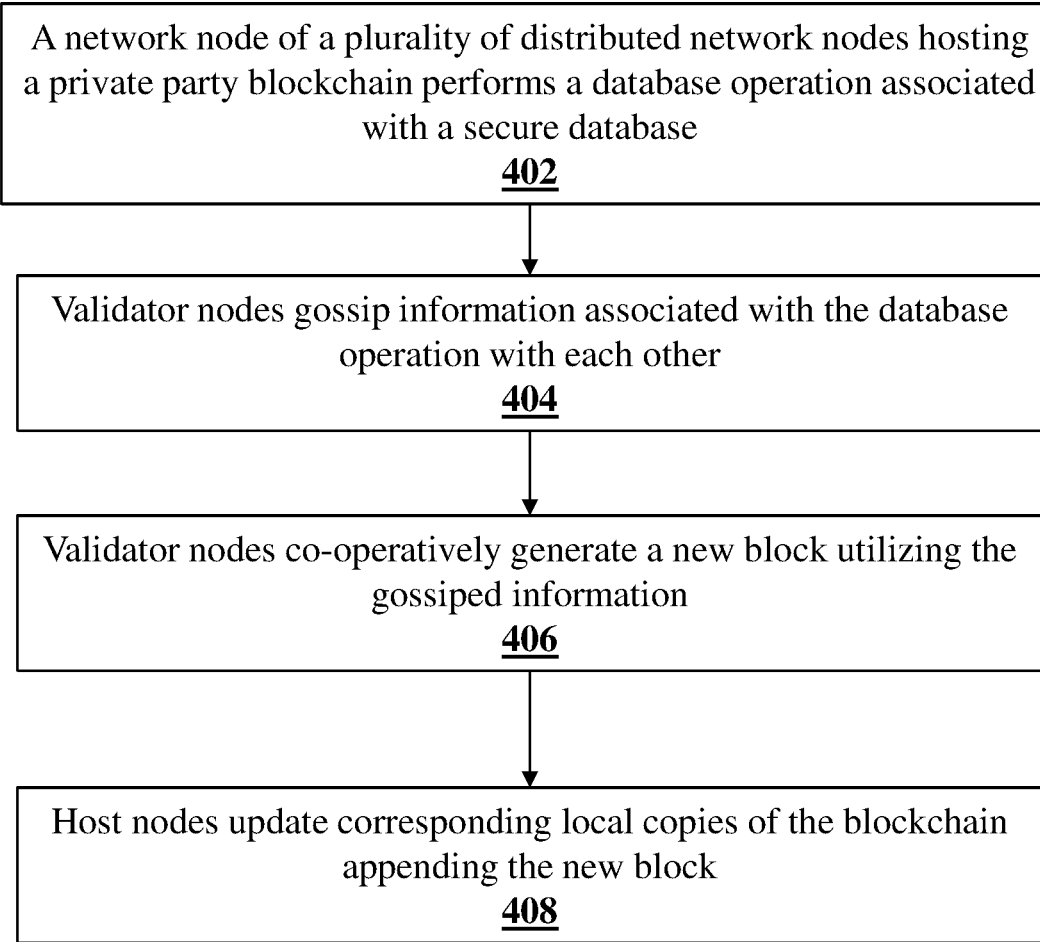
FIG. 4 shows a flow diagram of an illustrative method of accessing a database through a distributed access gateway, according to an embodiment.

FIG. 4 shows a flow diagram of an illustrative method 400 of secure database access through a distributed access gateway, according to an embodiment. The steps of the method shown in FIG. 4 and described herein are merely illustrative and should not be considering limiting. Other methods with additional, alternative, or a fewer number of steps should be considered within the scope of this disclosure.

The method 400 may start at step 402, where a network node may perform a database operation associated with a secure database. The network node may be within a plurality of distributed network nodes hosting a private party blockchain. The distributed network nodes may interface a plurality of secure databases and operate as an access gateway to the plurality of secure databases. The private party blockchain may maintain immutable records of the database operations associated with the plurality of secure databases. An illustrative database operation is document access from the secure database.

At a next step 404, validator nodes of the distributed network nodes gossip information associated with the database operation with each other. For example, a subset of the distributed network nodes may be selected to validate the database operation and the selected nodes may transmit and receive information associated with the database operation from each other such that each of the validator nodes have the information. In other words, the gossiping among the validator nodes may saturate the validator network nodes with the information associated with the database operation.

At a next step 406, the validator nodes generate a new block utilizing the gossiped information. More specifically, at least one of the validator nodes may include the information in the new block and generate a hash of the information combined with the content from at least one of the previous blocks. The hash of the content of the previous block cryptographically links the new block with the previous blocks of the blockchain.

At a next step 408, the host nodes update corresponding local copies of the blockchain by appending the new block. More specifically, the validator nodes may gossip the new block to the host nodes. Upon receiving the new block, the host nodes may append the new node to the corresponding local copies of the blockchain, thereby creating an immutable record of the database operation within the plurality of distributed network nodes.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A system comprising:
a plurality of distributed network nodes, each network node having a non-transitory storage medium storing a plurality of computer program instructions forming a peer-to-peer client and a processor electrically coupled to the non-transitory storage medium and configured to execute the plurality of computer program instructions to perform one or more operations of a private party blockchain hosted by the plurality of distributed network nodes;
the private party blockchain configured to validate one or more database operations of a plurality of secure databases of different types interfacing the plurality of distributed network nodes, wherein the plurality of secure databases is external to the private party blockchain, and wherein the plurality of distributed network nodes defines an access gateway in communication with the plurality of secure databases;
a first subset of the plurality the distributed network nodes configured to be validator nodes causing the corresponding processors to execute corresponding peer-to-peer clients to gossip with each other to co-operatively validate the one or more database operations and generate a new block; and
a second subset of the plurality of distributed network nodes configured to be host nodes causing the corresponding processors to execute corresponding peer-to-peer clients update the corresponding local copies of the private party blockchain appending the new block generated by the validator nodes.

2. The system according to claim 1, wherein the first subset of the plurality of distributed network nodes and the second subset of the plurality of distributed network nodes include at least one common network node.

3. The system according to claim 1, wherein the new block is generated based upon a proof of authority protocol.

4. The system according to claim 1, wherein the one or more database operations include accessing a document from at least one or the plurality of secure databases.

5. The system according to claim 4, wherein the one or more database operations include updating the document.

6. The system according to claim 4, wherein at least one network node of the plurality of distributed network nodes is configured to:
receive an access request for the document from a user device associated with a user;
compare a permission level of the user with a permission level of the document; and
provide the document for display on the user device in response to the network node determining that the permission level of the user is equal to or exceeds the permission level of the document.

7. The system according to claim 6, wherein to provide the document for display on the user device, the network node is configured to:

transmit the document to the user device.

8. The system according to claim 6, wherein to provide the document for display on the user device, the network node is configured to:

stream the document to the user device.

9. The system according to claim 6, wherein the document is encrypted with a public key of the user.

10. The system according to claim 6, wherein the network node is further configured to gossip information of the user accessing the document with at least another node of the plurality of distributed network nodes.

11. A computer-implemented method comprising:

performing, by a first network node of a plurality of distributed network nodes, a database operation associated with at least one of a plurality of secure databases of different types interfacing the plurality of distributed network nodes, wherein the plurality of distributed network nodes host a private party blockchain, wherein the plurality of secure databases is external to the private party blockchain, and wherein the plurality of distributed network nodes defines an access gateway in communication with the plurality of secure databases;

gossiping, by a first subset of the plurality of distributed network nodes operating as validator nodes, information associated with the database operation with each other;

co-operatively generating, by the first subset of the plurality of distributed network nodes, a new block by validating the database operation utilizing the gossiped information; and updating, by a second subset of the plurality of distributed network nodes operating as host nodes, corresponding local copies of the private party blockchain appending the new block generated by the first subset of the plurality of distributed network nodes operating as validator nodes.

12. The computer-implemented method according to claim 11, wherein the first subset of the plurality of distributed network nodes and the second subset of the plurality of distributed network nodes include at least one common network node.

13. The computer-implemented method according to claim 11, wherein the new block is generated based upon a proof of authority protocol.

14. The computer-implemented method according to claim 11, wherein the database operation includes accessing a document from at least one or the plurality of secure databases.

15. The computer-implemented method according to claim 14, wherein the database operation includes updating the document.

16. The computer-implemented method according to claim 14, further comprising:

receiving, by the first network node, an access request for the document from a user device associated with a user;

comparing, by the first network node, a permission level of the user with a permission level of the document; and providing, by the first network node, the document for display on the user device in response to the first network node determining that the permission level of the user is equal to or exceeds the permission level of the document.

17. The computer-implemented method according to claim 16, wherein providing the document for display comprises:

transmitting, by the first network node, the document to the user device.

18. The computer-implemented method according to claim 16, wherein providing the document for display comprises:

streaming, by the first network node the document to the user device.

19. The computer-implemented method according to claim 16, wherein the document is encrypted with a public key of the user.

20. The computer-implemented method according to claim 16, further comprising: gossiping, by the first network node, information of the user accessing the document with at least another node of the plurality of distributed network nodes.

* * * * *